United States Patent
Morshedi et al.

(10) Patent No.: US 9,451,566 B1
(45) Date of Patent: Sep. 20, 2016

(54) POWER AMPLIFIER TRANSMISSION MODE SWITCHING IN WIRELESS COMMUNICATION DEVICES

(71) Applicant: QUALCOMM Incorporated, San Diego, CA (US)

(72) Inventors: Ali Morshedi, San Diego, CA (US); Mihir Suvhir Anandpara, San Diego, CA (US); Partick Cantey, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/841,780

(22) Filed: Sep. 1, 2015

(51) Int. Cl.
    *H04W 52/38* (2009.01)
    *H04W 52/02* (2009.01)
    *H04W 88/06* (2009.01)

(52) U.S. Cl.
    CPC ......... *H04W 52/38* (2013.01); *H04W 52/0225* (2013.01); *H04W 52/0261* (2013.01); *H04W 88/06* (2013.01)

(58) Field of Classification Search
    CPC .................. H04W 52/00–52/60; H04W 88/06
    USPC .................................... 455/69, 522; 370/318
    See application file for complete search history.

(56) References Cited

U.S. PATENT DOCUMENTS

| | | |
|---|---|---|
| 8,829,993 B2 | 9/2014 | Briffa et al. |
| 8,873,677 B1 | 10/2014 | Loh et al. |
| 2014/0111178 A1* | 4/2014 | Khlat ........................ G05F 1/46 323/293 |
| 2014/0155116 A1 | 6/2014 | Dakshinamurthy et al. |
| 2014/0203868 A1 | 7/2014 | Khlat et al. |

* cited by examiner

*Primary Examiner* — Raymond Dean
(74) *Attorney, Agent, or Firm* — The Marbury Law Group, PLLC (57) ABSTRACT

Various embodiments include methods implemented on a wireless communication device for reducing interference during a tune-away from a first subscription to a second subscription when a transmitter remains tuned to the first subscription. The methods may include determining whether the first subscription will utilize the transmitter during the tune-away to the second subscription when the transmitter is operating in envelope tracking mode, and switching the transmitter from envelope tracking mode to average power tracking mode during the tune-away in response to determining that the first subscription will utilize the transmitter during the tune-away to the second subscription. The methods may further include determining whether interference of the receiver by the transmitter exceeds a threshold, switching the transmitter to average power tracking mode during the tune-away if the interference exceeds the threshold, and leaving the transmitter in envelope tracking mode if the interference does not exceed the threshold.

25 Claims, 5 Drawing Sheets

POWER AMPLIFIER TRANSMISSION MODE SWITCHING IN WIRELESS COMMUNICATION DEVICES

BACKGROUND

Some designs of wireless communication devices—such as smart phones, tablet computers, and laptop computers—contain one or more Subscriber Identity Module (SIM) cards that provide users with access to multiple separate mobile telephony networks. Examples of mobile telephony networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), Universal Mobile Telecommunications Systems (UMTS), evolved High Speed Packet Access (HSPA+), Dual-Cell High Speed Packet Access (DC-HSPA), Evolution Data-Optimized (EV-DO), Enhanced Data rates for GSM Evolution (EDGE), and single carrier Radio Transmission Technologies (1×RTT).

To enable communications in various networks, a wireless communication device may process data to be transmitted over a radio frequency (RF) resource and may perform complementary processing on received RF signals to recover data. In particular, data transmission may involve encoding and modulating the data, generating data samples, and conditioning the samples to generate an output RF signal. Wireless communication devices typically include a power amplifier (PA) to provide high transmit power for the output RF signal. The PA amplifies the RF signal to a desired level for transmission, which may depend on how far the user is away from a base station.

Since power amplification consumes power, techniques to improve the efficiency of power amplifiers may be implemented in wireless communication devices in order to prolong operation on a battery charge. Such techniques may include adjusting the power supplied to the power amplifier so that the applied power tracks the amount of power in the transmit signal. Adjusting the applied power based on the transmit signal is referred to generally as envelope tracking (ET) mode and there are different forms or modes of envelope tracking that can be implemented. Another mode of operation is average power tracking (APT) mode, in which the applied power is adjusted on a per transmission slot basis. Thus in ET mode, the applied power constantly fluctuates as the signal amplitude fluctuates while in APT mode the applied power is constant within each slot, and changes discretely between slots.

A wireless communication device that includes one or more SIMs and connects to two or more separate mobile telephony networks using one or more shared RF resources/radios may be termed a multi-SIM-multi-standby (MSMS) wireless communication device. One example is a dual-SIM-dual-standby (DSDS) communication device, which includes two SIM cards/subscriptions that are each associated with a separate radio access technology (RAT), and the separate RATs share one RF resource chain to communicate with two separate mobile telephony networks on behalf of their respective subscriptions. When one subscription is using the RF resource, the other subscription is in stand-by mode and is not able to communicate using the RF resource.

One consequence of having a plurality of subscriptions that maintain network connections is that the subscriptions may sometimes interfere with each other's communications. For example, two subscriptions on a DSDS communication device utilize a shared RF resource to communicate with their respective mobile telephony networks, and only one subscription may use the RF resource to communicate with the subscription's mobile network at a time. Even when a subscription is in an idle or standby mode, meaning that the subscription is not actively communicating with the network, the subscription may still need to periodically receive access to the shared subscription resource in order to perform various network operations. For example, an idle subscription may need the shared RF resource at regular intervals to perform idle-mode operations to receive network paging messages in order to remain connected to the network, etc.

In conventional wireless communication devices, the subscription actively using an RF resource that is shared with an idle RAT may occasionally be forced to interrupt the active subscription's RF operations so that the idle subscription may use the shared RF resource to perform the idle subscription's idle-standby mode operations (e.g., paging monitoring and decoding, cell reselection, system information monitoring, etc.). This process of switching access of the shared RF resource from the active subscription to the idle subscription is sometimes referred to as a "tune-away," as the RF resource tunes away from the active subscription's frequency band or channel and tune to the idle subscription's frequency bands or channels. After the idle subscription has finished network communications, access to the RF resource may switch from the idle subscription to the active subscription via a "tune-back" operation.

In some RF resources, the active subscription may still retain use of one or more transmitters in the RF resource during the tune-away to the idle subscription. Because the idle subscription only receives information from the network during a tune-away, the idle subscription may only need to utilize receivers in the RF resource and not transmitters. Thus, the transmitters may still be available to the active subscription to transmit information during the tune-away. However, the simultaneous operation of the transmitter and the receiver in the RF resource may result in interference effects that degrade the reception ability of the receiver. Generally, receiver desensitization (sometimes referred to as "de-sense"), or degradation of receiver sensitivity, may result from noise interference of a nearby transmitter caused by transmitter harmonics, reception band noise, or other sources. This interference may be especially pronounced when the transmitter is operating in ET mode because the continuous power fluctuations amplifies noise effects and generates more interfering harmonics. Thus then a tune-away occurs, operation of the transmitter in ET mode by the active subscription may cause significant de-sense with the receiver used by the idle subscription to receive paging information.

SUMMARY

Various embodiments include methods implemented on a wireless communication device for performing a tune-away from a first subscription to a second subscription, the wireless communication device having a transmitter. The methods may include determining whether the first subscription will utilize the transmitter during the tune-away to the second subscription when the transmitter is operating in envelope tracking mode, and switching the transmitter from envelope tracking mode to average power tracking mode during the tune-away in response to determining that the first subscription will utilize the transmitter during the tune-away to the second subscription.

In some embodiments, the method may further include switching the transmitter back to envelope tracking mode after the tune-away is complete. In some embodiments, the second subscription may utilize a receiver of the wireless communication device during the tune-away. In some embodiments, the method may further include turning off the transmitter for the duration of the tune-away in response to determining that the first subscription will not utilize the transmitter during the tune-away to the second subscription. In some embodiments, switching the transmitter from envelope tracking mode to average power tracking mode during the tune-away may reduce interference of the first subscription on the second subscription during the tune-away. In some embodiments, the transmitter may operate at a higher average power in average power tracking mode than in envelope tracking mode during the tune-away.

In some embodiments, the transmitter may include a mode switch, an envelope tracking power supply, and an average power tracking power supply, and switching the transmitter from envelope tracking mode to average power tracking mode during the tune-away may include causing the mode switch to switch from the envelope tracking power supply to the average power tracking power supply.

In some embodiments, the method may further include determining whether interference of the first subscription on the second subscription during the tune-away exceeds a threshold, switching the transmitter from envelope tracking mode to average power tracking mode during the tune-away in response to determining that the interference caused by the first subscription on the second subscription during the tune-away exceeds the threshold, and leaving the transmitter in envelope tracking mode during the tune-away in response to determining that the interference caused by the first subscription on the second subscription during the tune-away does not exceed the threshold.

Further embodiments include a wireless communication device including a memory and a processor configured with processor-executable instructions to perform operations of the methods described herein. Further embodiments include a non-transitory processor-readable storage medium having stored thereon processor-executable software instructions configured to cause a processor to perform operations of the methods described herein. Further embodiments include a wireless communication device that includes means for performing functions of the operations of the methods described herein.

BRIEF DESCRIPTION OF THE DRAWINGS

The accompanying drawings, which are incorporated herein and constitute part of this specification, illustrate exemplary aspects of the claims, and together with the general description and the detailed description given herein, serve to explain the features of the claims.

DETAILED DESCRIPTION

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

The terms "mobile communication device," "mobile device," "communication device," "wireless communication device" and "wireless device" are used interchangeably herein to refer to any one or all of cellular telephones, smart phones, personal or mobile multi-media players, personal data assistants (PDAs), laptop computers, tablet computers, smart books, smart watches, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless communication device on a network. The term SIM may also be used as shorthand reference to a communication network associated with a particular SIM, since the information stored in a SIM enables the wireless communication device to establish a communication link with a particular network, thus the SIM and the communication network, as well as the services and subscriptions supported by that network, correlate to one another.

As used herein, the terms "multi-SIM multi-standby communication device," "MSMS communication device," and "MSMS device" are used interchangeably to refer to a wireless communication device that is configured with more than one SIM and configured to share a single RF resource to handle communications with networks of two or more subscriptions. DSDS communication devices are an example of a type of MSMS communication device.

As used herein, the terms "wireless network," "cellular network," "system," "public land mobile network," and "PLMN" are used interchangeably to describe a wireless network of a carrier associated with a wireless communication device and/or subscription on a wireless communication device, and/or its roaming partners.

As used herein, the term "RF resource" refers to the components in a wireless communication device that send, receive and decode radio frequency signals. These components may include one or more transmitters, one or more receivers, and one or more transceivers. An RF resource typically includes a number of components coupled together that transmit RF signals that are referred to as a "transmit chain," and a number of components coupled together that receive and process RF signals that are referred to herein as a "receive chain."

As used herein, the terms "envelope tracking," "envelope tracking mode," and "ET mode" are used interchangeably to refer to a technique for improving efficiency of a power amplifier during transmission on a wireless communication device by varying or controlling the voltage level of the power supply of the power amplifier in relation to an envelope of the transmitted RF signal. Thus, when the power level of the transmitted RF signal increases or decreases, there is a corresponding increase or decrease in the voltage supplied to the power amplifier. To implement envelope tracking, additional transmit chain components (e.g., a digital-to-analog converter (DAC)) may be needed in order to ensure that the power amplifier only receives the voltage, and thus the power, required to deliver the transmit signal in a discrete fashion. Such additional components may be separately provided on the device.

A transmitter and power amplifier in a wireless communication device may be configured to use various transmission modes. The simplest transmission mode may be a bypass power mode, in which the power applied to the transmit signal is constant. Other transmission modes may reduce the amount of power necessary to operate the transmitter. An example of such a transmission mode is ET mode, in which the power applied to the transmit signal is dynamically adjusted to conform to the transmit signal amplitude. Another example of a power-saving transmission mode is APT mode, in which the power applied to the transmit signal is adjusted discretely at every transmission slot. Transmitting in ET mode saves more power than in APT mode because the applied power tracks the signal amplitude on a continuous basis rather than a per slot basis.

In a MSMS device, for example a DSDS device, an active subscription may be transmitting information to a network. The transmitter of the RF resource may be operating in ET mode. On a periodic basis, the RF resource may tune to the idle subscription so that the idle subscription may receive paging information and perform other idle mode operations. The idle subscription may only utilize the receiver in the RF resource and thus the active subscription may continue to use the transmitter to transmit information. However, operation of the transmitter simultaneously with the receiver may result in receiver de-sense, thus reducing the reliability of the receiver during the tune-away. If the transmitter is operating in ET mode, the receiver de-sense may be pronounced because the continuous variation of transmission power may result in higher occurrence of interfering harmonics and greater amplification of noise. One way to deal with receiver de-sense may be to impose transmission power backoff (i.e., impose maximum power thresholds) on the transmitter, which may result in an overall lower transmission power.

Systems, methods, and devices of various embodiments enable a wireless communication device to reduce receiver de-sense when performing a tune-away from a first subscription to a second subscription. The first subscription may be using a transmitter of an RF resource in the wireless communication device to transmit information to a network. The transmitter may be operating in ET mode. A tune-away may from the first subscription to the second subscription may be scheduled. The wireless communication device processor may determine whether the first subscription will utilize the transmitter of the RF resource during the tune-away.

If the device processor determines that the first subscription will utilize the transmitter of the RF resource during the tune-away, the device processor may switch the transmitter from ET mode to APT mode for the duration of the tune-away. In APT mode, the power applied to the transmitter stays constant during each transmission slot, and varies discretely between each transmission slot. This may result in less interference with the receiver used by the second subscription during the tune-away because there may be less amplified noise and fewer interfering harmonics. It may also allow the transmitter to have a higher average transmission power during the tune-away than in ET mode because transmission power backoff is not necessary. After the tune-away is complete, the device processor may switch the transmitter back to ET mode.

Figure 1:
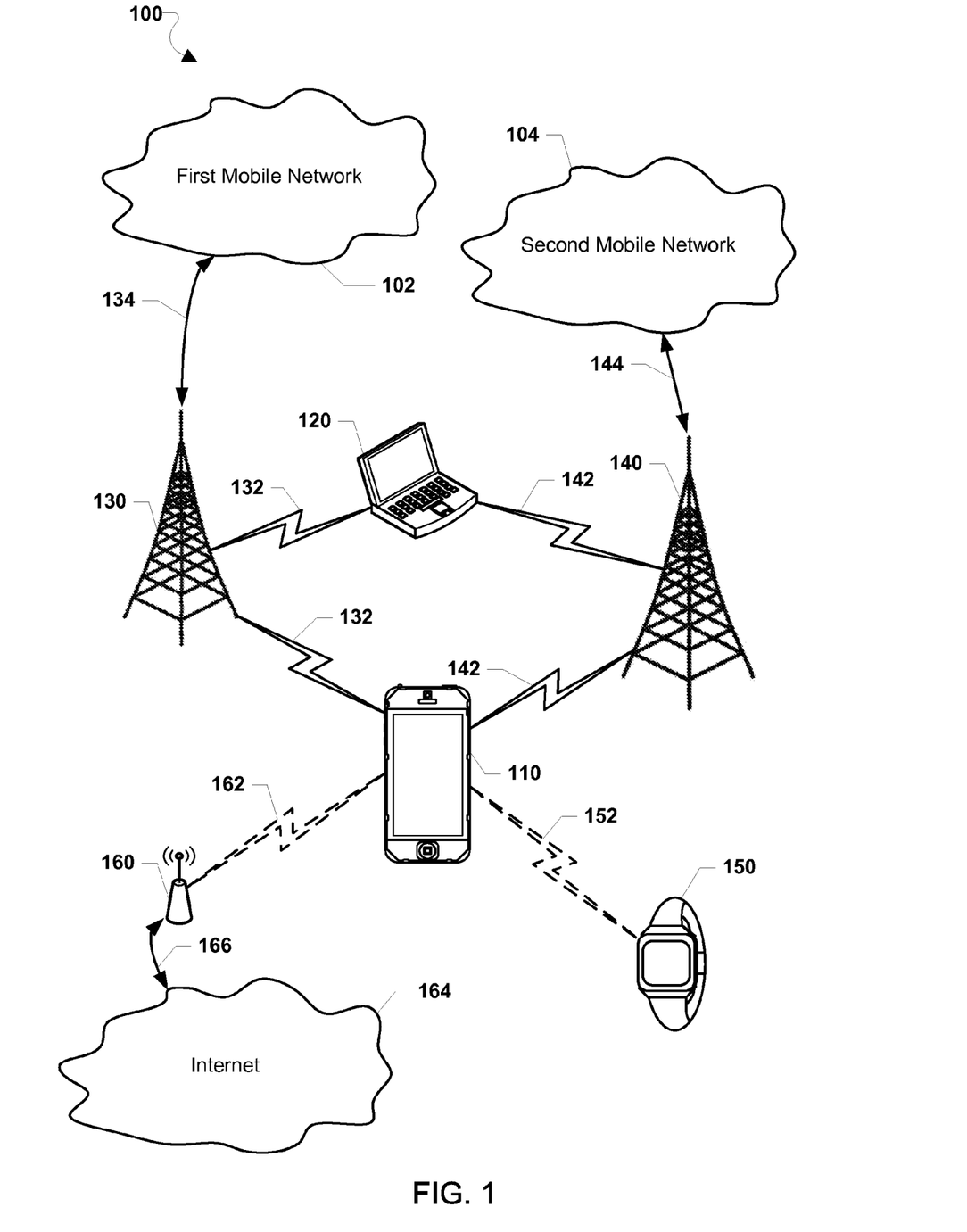
FIG. 1 is a communication system block diagram of a network suitable for use with various embodiments.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first wireless communication device 110 may be in communication with the first mobile network 102 through a cellular connection 132 to the first base station 130. The first wireless communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second wireless communication device 120 may similarly communicate with the first mobile network 102 through the cellular connection 132 to the first base station 130. The second wireless communication device 120 may also communicate with the second mobile network 104 through the cellular connection 142 to the second base station 140. The cellular connections 132 and 142 may be made through two-way wireless communication links, such as 3G, 4G, LTE, TDMA, CDMA, WCDMA, GSM, UMTS, and other mobile telephony communication technologies.

While the wireless communication devices 110, 120 are shown connected to the first mobile network 102 and, optionally, to the second mobile network 104, in some embodiments (not shown), the wireless communication devices 110, 120 may include two or more subscriptions to two or more mobile networks and may connect to those subscriptions in a manner similar to those described herein.

In some embodiments, the first wireless communication device 110 may optionally establish a wireless connection 152 with a peripheral device 150 used in connection with the first wireless communication device 110. For example, the first wireless communication device 110 may communicate over a Bluetooth® link with a Bluetooth-enabled personal computing device (e.g., a "smart watch"). In some embodiments, the first wireless communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second wireless communication device 120 may similarly be configured to connect with the peripheral device 150 and/or the wireless access point 160 over wireless links.

Figure 2:
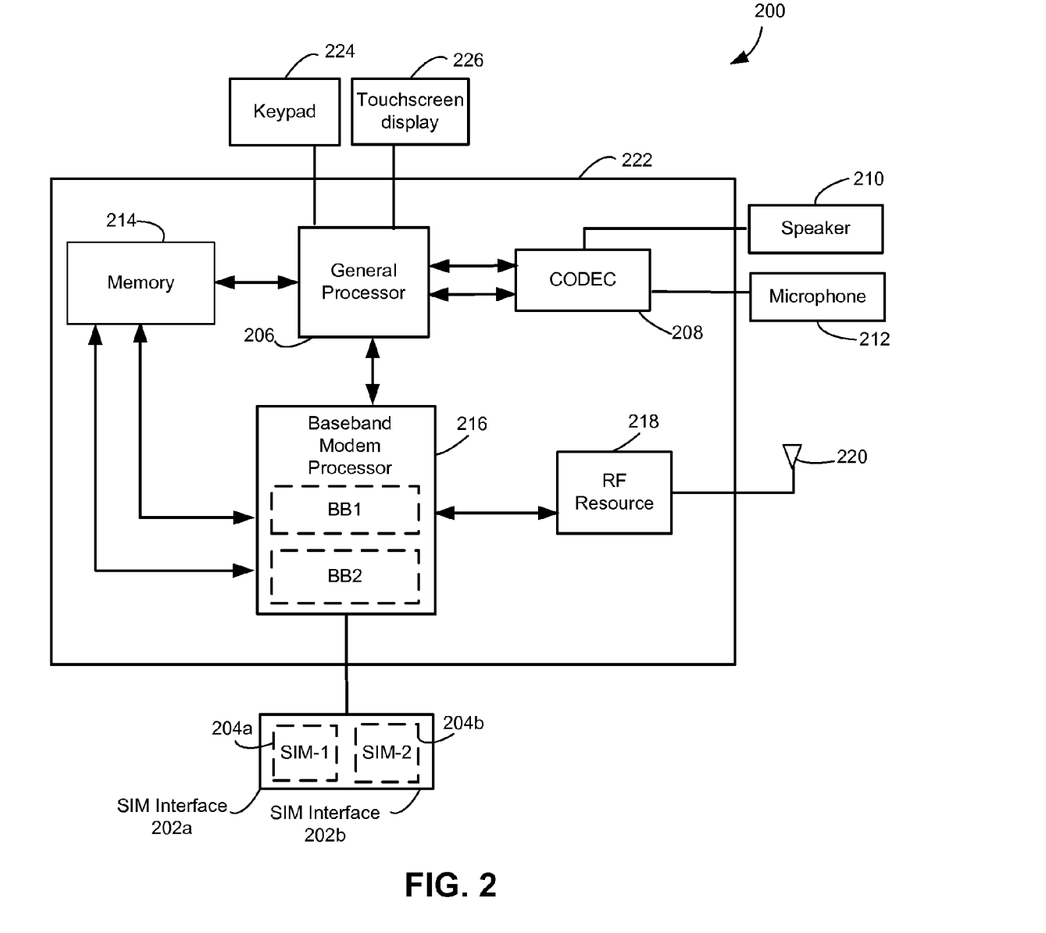
FIG. 2 is a block diagram illustrating a wireless communication device according to various embodiments.

FIG. 2 is a functional block diagram of a wireless communication device 200 suitable for implementing various embodiments. According to various embodiments, the wireless communication device 200 may be similar to one or more of the wireless communication devices 110, 120 as described herein. With reference to FIGS. 1-2, the wireless communication device 200 may include a first SIM interface 202a, which may receive a first SIM ("SIM-1") 204a that is associated with a first subscription. The wireless communication device 200 may also include a second SIM interface 202b, which may receive a second SIM ("SIM-2") 204b that is associated with a second subscription.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIMs 204a, 204b may have a central processing unit (CPU), read only memory (ROM), random access memory (RAM), electrically erasable programmable read only memory (EEPROM) and input/output (I/O) circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number/Network Identification Number (NID) pair, a Home Public Land Mobile Network (HPLMN) code, etc.) to indicate the SIM network operator provider. An Integrated Circuit Card Identity (ICCID) SIM serial number may be printed on one or more of the SIMs 204a, 204b for identification. However, a SIM may be implemented within a portion of memory of the wireless communication device 200 (e.g., memory214), and thus need not be a separate or removable circuit, chip or card.

The wireless communication device 200 may include at least one controller, such as a general-purpose processor 206, which may be coupled to one or more coder/decoder (CODEC) 208. The CODEC 208 may in turn be coupled to a speaker 210 and a microphone 212. The general-purpose processor 206 may also be coupled to the memory 214.

The memory 214 may be a non-transitory tangible computer readable storage medium that stores processor-executable instructions. For example, the instructions may include routing communication data relating to the first or second subscription though the transmit chain and receive chain of a corresponding baseband-RF resource. The memory 214 may store operating system (OS), as well as user application software and executable instructions. The memory 214 may also store application data, such as an array data structure.

The general-purpose processor 206 and memory 214 may each be coupled to at least one baseband modem processor 216. Each of the SIMs 204a, 204b in the wireless communication device 200 may be associated with a baseband-RF resource chain that may include the baseband modem processor 216—which may perform baseband/modem functions for communicating with/controlling a RAT—and one or more amplifiers and radios, referred to generally herein as RF resource 218. In some embodiments, baseband-RF resource chains may share the baseband modem processor 216 (i.e., a single device that performs baseband/modem functions for all SIMs on the wireless communication device 200). In other embodiments, each baseband-RF resource chain may include physically or logically separate baseband processors (e.g., BB1, BB2).

In various embodiments, the RF resource 218 may be coupled to at least one wireless antenna 220 and may perform transmit and/or receive functions for the wireless services associated with each of the SIM 204a, 204b of the wireless communication device 200. In some embodiments, the RF resource 218 may be coupled to the wireless antenna 220 for sending and receiving RF signals for the SIMs 204a, 204b, thereby enabling the wireless communication device 200 to perform communications with separate networks and/or services associated with the SIMs 204a, 204b. The RF resource 218 may provide separate transmit and receive functionality, or may include a transceiver that combines transmitter and receiver functions. In some embodiments, the wireless antenna 220 may represent a plurality of antennas associated with the RF resource 218, such as to support diversity reception or transmission.

In some embodiments, the general-purpose processor 206, the memory 214, the baseband modem processor(s) 216, and the RF resource 218 may be included in the wireless communication device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless communication device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless communication device 200 to enable communication between them as is known in the art.

Functioning together, the two SIMs 204a, 204b, the baseband modem processor 216, the RF resource 218, and the wireless antenna 220 may constitute two or more RATs supporting two or more subscriptions. For example, a SIM, baseband processor, and RF resource may be configured to support two different radio access technologies, such as GSM and WCDMA. More RATs may be supported on the wireless communication device 200 by adding more SIM cards, SIM interfaces, RF resources, and/or antennae for connecting to additional mobile networks.

Separate units of a baseband modem processor(s) (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

In MSMS wireless communication devices, the RF resource may include at least one receive chain and a transmit chain, each of which may include various amplifiers. For example, the transmit chain may include at least one power amplifier that amplifies an RF signal prior to transmission via an antenna. In various embodiments, the at least one power amplifier that performs RF signal amplification for one or more transmit chains may be implemented in a power amplifier module, which may include any number of separate or shared components. The efficiency of a power amplifier may significantly impact capabilities of a wireless communication device in a number of ways. For example, the power amplifier efficiency may affect the battery life of the device, and the output power and linearity of the power amplifier may be directly correlated with transmission performance.

The continued evolution of wireless communication standards (e.g., GSM, UMTS, CDMA, etc.) and further evolved standards (e.g., LTE, etc.) may generate challenging technical requirements for transmit chains on a wireless communication device. Such challenges may include, for example, the need to support a variety of different channel coding and modulation techniques (CDMA, orthogonal frequency division multiplexing (OFDM), etc.), as well as broader channel bandwidths. For example, in modulation schemes currently utilized for data transmission in some networks (e.g., LTE, WCDMA, etc.), RF transmit signals may incorporate information in an amplitude component in addition to phase and/or frequency components. As a result, the power amplifier cannot operate in compression, which would distort the amplitude information. Therefore, wireless communication devices capable of transmitting in such schemes may require use of linear power amplifiers and may suffer from reduced efficiency when operated below the maximum output power as limited by the battery voltage.

In various embodiments, the power amplifier may support multiple operating modes that may be associated with different output power levels, gains, etc. to mitigate constraints on linearity and efficiency. Typically, the power amplifier's generation of an amplified RF transmit signal ("RFout" signal) has at least some non-linearity, which may result in wasted power depending on the operating mode. For example, in a bypass mode, the battery voltage may be directly provided as a fixed power amplifier supply voltage for the power amplifier to amplify an upconverted RF signal ("RFin" signal). Since the power amplifier supply voltage must be greater than the signal peaks of the RF signal to be amplified (i.e., the RFin signal) to avoid clipping the RFout signal, the battery voltage of the wireless communication device in bypass mode may be a constant high value, regardless of the actual voltage of the RFin signal/transmit power required in the amplified RFout signal. As a result, excess current is drawn in the power amplifier and dissipated as wasted energy when the power amplifier operates in a bypass mode.

Another operating mode that may be implemented in a wireless communication device power amplifier is an average power tracking (APT) mode, which may reduce the power wasted by the power amplifier compared to the bypass mode. In the APT mode, the power amplifier supply voltage may be adjusted based on the average transmit power of the RFin signal. In this manner, the power amplifier supply voltage may cause the power amplifier to operate close to the compression point, thereby improving efficiency. In various embodiments utilizing APT mode, voltage values may be predetermined for every power level so that linearity of the power amplifier may be maintained on a whole operating bandwidth. In some embodiments, in APT mode operation, the power amplifier supply voltage may be adjusted periodically after a fixed interval, for example, following each LTE slot (e.g., every 0.5 ms).

Another operating mode that may be implemented by a wireless communication device power amplifier is envelope tracking (ET). ET mode may further reduce wasted power and increase efficiency compared to APT mode. In ET mode, instead of adjusting the power amplifier supply voltage to approximate the compression point for the power amplifier, an "envelope" of the transmit signal to be amplified (i.e., plot of amplitude peaks) may be used to control the power amplifier supply voltage. In this manner, the power amplifier supply voltage may be continuously adjusted to operate at the peak efficiency for the power required at each instant of the transmission. Therefore, ET mode is typically the most power efficient operation for the power amplifier.

In various embodiments, operation in ET mode may require additional functions that are typically associated with the main RF transmit signal. For example, unlike APT mode, operating the power amplifier in ET mode requires converting a control signal (i.e., envelope) into an analog format to ensure that the power amplifier supply voltage is closely tracking the peaks of the RF transmit signal. This conversion may be performed by a digital-to-analog converter (DAC) component.

Figure 3:
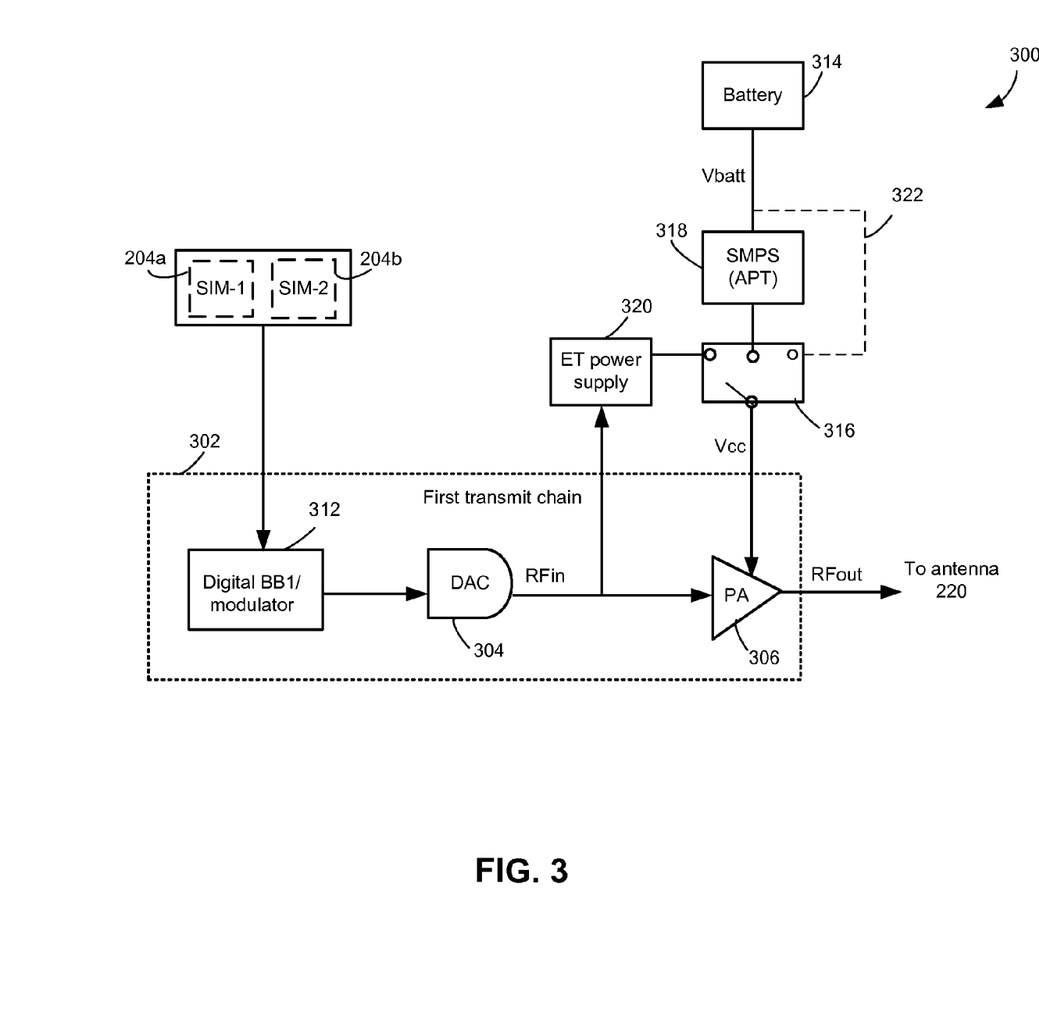
FIG. 3 is a block diagram illustrating an example configuration of components associated with controlling operation modes of a power amplifier on a RF resource according to various embodiments.

FIG. 3 illustrates a configuration 300 of transmission elements that may interact in a wireless communication device to enable use of different modes to control power amplification according to various embodiments. With reference to FIGS. 1-3, such transmission elements in the configuration 300 may be functions and/or components of one of the wireless communication devices 110, 120, and/or 200 and may be associated with calls enabled on the first SIM 204a and/or second SIM 204b. In particular, the configuration 300 may enable the wireless communication device to operate in bypass mode, APT mode, and ET mode.

In various embodiments, communication data associated with the SIMs 204a, 204b may be processed for transmission through a corresponding transmit chain 302. The transmit chain 302 may include any one or more components performing functions to route communication data associated with the SIMs 204a, 204b for transmission through a corresponding baseband-RF resource chain. In some embodiments, the transmit chain 302 may include functional components of the baseband modem processor(s) 216 (e.g., BB1) and RF frontend components of the RF resource 218 to condition signals for transmission. Such RF frontend components may include, for example, a DAC 304, a power amplifier (PA) 306, as well as filters, mixers, and other components that are not shown, the functions and details of which are known in the art of digital transceiver design.

In various embodiments, in the configuration 300, functions of the baseband modem processor(s) 216 associated with the first SIM 204a and second SIM 204b may be implemented by digital BB1/modulator. In particular, the digital BB1/modulator 312 may generate a modulated RF signal with the communication data for transmission. The digital BB1/modulator 312 may employ any of a number of modulation schemes (e.g., quadrature, polar, etc.) that encode the data for transmission by varying properties of an RF carrier waveform. For example, the digital BB1/modulator 312 may be configured to use quadrature amplitude modulation (QAM), in which in-phase (I) and quadrature (Q) signals based on the information baseband signal are represented as variations in the amplitude, frequency and/or phase of a waveform.

The modulated RF signal with the communication data for transmission may be input into the DAC 304, which converts the modulated RF signal into an analog format RFin signal. Other components may be provided in the first transmit chain 302 to perform functions including, but not limited to, mixers for upconverting the I and Q signals to radio frequencies, a signal combiner for combining the upconverted I and Q, filters that filter frequency content of signals, etc.

In various embodiments, the power amplifier 306 may be configured to amplify the analog format RFin signal received from the DAC 304 to generate the RFout signal at a desired output power level. The RFout signal in various embodiments may subsequently be provided to one or more antennas (e.g., 220) for transmission over the radio interface to a network (e.g., 110, 114) through a base station (e.g., 106, 108, 112).

In some embodiments, the configuration 300 may include a power supply, such as a battery 314, which may provide battery voltage information (Vbatt) for use in adjusting voltage at the power amplifier 306. The configuration 300 may also include a mode switch 316 to allow the wireless communication device to switch operating modes by switching between sources of the power amplifier supply voltage. A switched mode power supply (SMPS) 318 may receive the Vbatt and generate a power amplifier supply voltage (Vcc) for the power amplifier 306 operating in APT mode as described herein. The mode switch 316 may also be switched to allow the PA 306 to receive Vbatt directly from the battery 314 through bypass feed 322 to implement bypass power mode. The mode switch 316 may also be switched to an ET power supply 320 that implements ET mode power amplification. The ET power supply 320 may receive the envelope signal RFin from the DAC 304 to generate a power amplifier supply voltage for the power amplifier 306 that tracks the envelope signal RFin. The ET power supply module 320 may also include and/or be associated with any of a number of components or provide functions relating to processing the envelope signal. For example, the ET power supply module 320 may include an amplitude detector an envelope shaping block to adjust the envelope signal to optimize linearity of the power amplifier. A processor of the wireless communication device, such as the baseband modem processor 216 or the general processor 206, may control the mode switch 316 to switch the operating mode of the transmit chain 302 between APT mode, ET mode, and optionally bypass mode.

Figure 4:
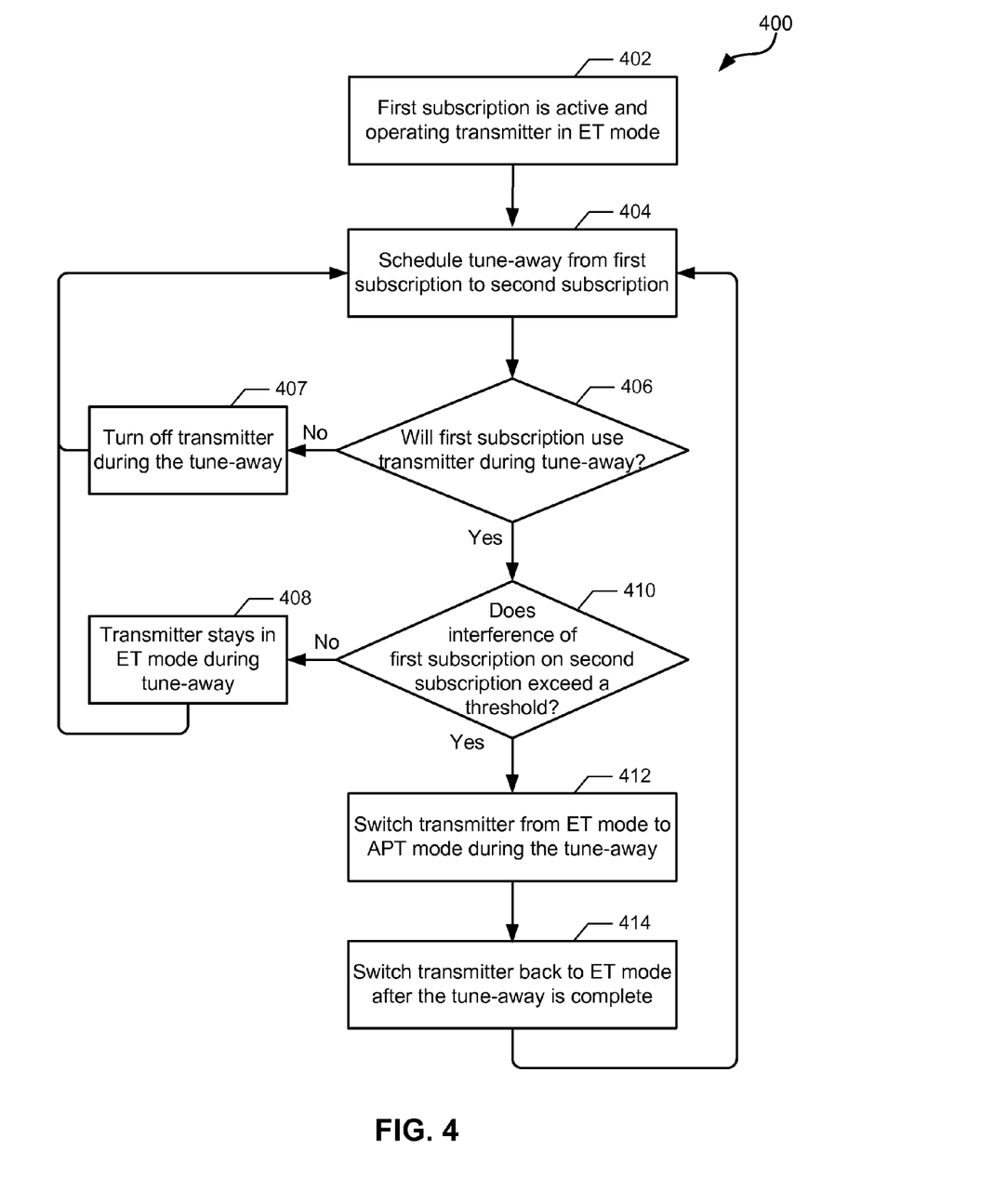
FIG. 4 is a process flow diagram illustrating a method for performing a tune-away on a wireless communication device according to various embodiments.

FIG. 4 illustrates a method 400 for performing a tune-away on a wireless communication device (e.g., 110, 120, 200 in FIGS. 1-2) according to various embodiments. The wireless communication device may have two or more SIMs and operate in a MSMS configuration. For example, a DSDS wireless communication device may have a first subscription associated with a first SIM and a second subscription associated with a second SIM, and both subscriptions share a RF resource that includes at least one transmit chain (e.g., transmitter) and at least one receive chain (e.g., receiver). With reference to FIGS. 1-4, in various embodiments, the operations of the method 400 may be implemented by one or more processors of the wireless communication device, such as the general-purpose processor 206 and/or baseband modem processor(s) 216, or a separate controller (not shown) that may be coupled to memory (e.g., 214) and to the baseband modem processor(s) 216.

In block 402, the first subscription in the wireless communication device may be the active subscription. The first subscription may be utilizing a transmitter of the RF resource in the wireless communication device to transmit information to its associated network. The transmitter may be configured as illustrated in the configuration 300 and may be operating in ET mode.

The processor may schedule a tune-away from the first subscription to the second subscription in block 404. For example, the second subscription may be idle but periodically wakes up in a tune-away to receive paging and other information from its associated network. The first subscription and the second subscription share the RF resource, and so during the tune-away the second subscription may utilize a receive chain (e.g., receiver) in the RF resource.

In determination block 406, the processor may determine whether the first subscription will utilize the transmit chain (e.g., transmitter) of the RF resource during the tune-away. For example, the processor may determine whether a radio link control (RLC) buffer or other data transmission buffers of the first subscription contain data to be transmitted during the tune-away. Because the second subscription may only need to use the receiver in the RF resource, the first subscription may still utilize the transmitter to transmit this information.

In response to determining that the first subscription will not utilize the transmitter during the tune-away (i.e., determination block 406="No"), the transmitter may turn off the transmitter for the duration of the tune-away in block 407 because no information is being transmitted.

In response to determining that the first subscription will utilize the transmitter during the tune-away (i.e., determination block 406="Yes"), the processor may determine whether the interference of the transmitter utilized by the first subscription on the receiver utilized by the second subscription during the tune-away exceeds a threshold in determination block 410. For example, the threshold may be based on certain error rates experienced by the second subscription due to different levels of de-sense caused by the first subscription.

In response to determining that the interference of the first subscription on the second subscription does not exceed the threshold (i.e., determination block 410="No"), the transmitter may stay in ET mode during the tune-away in block 408 because the interference is not causing significant error on the second subscription.

In response to determining that the interference of the first subscription on the second subscription exceeds the threshold (i.e., determination block 410="Yes"), the processor may switch the transmitter from ET mode to APT mode during the tune-away in block 412. For example, the processor may cause a switch in the transmitter (e.g., the mode switch 316) to switch from an ET mode power supply (e.g., the ET power supply 320) feeding a power amplifier of the transmitter (e.g., the PA 306) to an APT mode power supply (e.g., the SMPS 318).

The operations of blocks 404 through 414 of the method 400 may be repeated each time that a tune-away is scheduled.

While the transmitter is in APT mode, the transmitter generates less interference with the receiver used by the second subscription during the tune-away as compared to ET mode. This may be because ET mode amplifies more noise than APT mode and also generates more interfering harmonics. In addition, the processor may not need to implement power backoff while in APT mode as compared to ET mode, thus resulting in higher average power transmission in the transmitter during the tune-away. After the tune-away is complete, the processor may switch the transmitter back to ET mode from APT mode in block 414. In this manner, the method 400 provides a way to reduce interference between a first subscription utilizing a transmitter and a second subscription utilizing a receiver to receive paging and other idle mode information.

Figure 5:
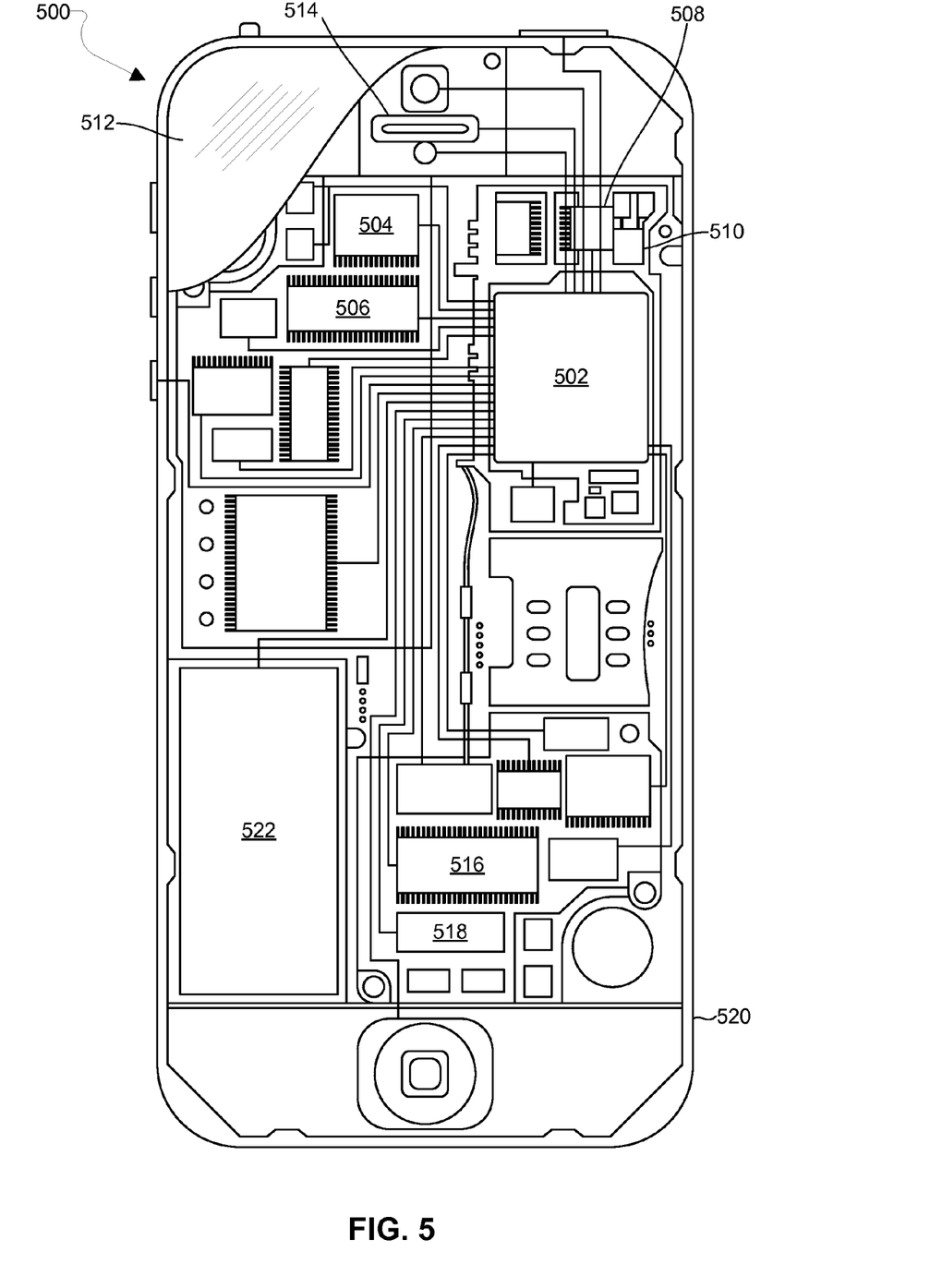
FIG. 5 is a component diagram of an example wireless communication device suitable for use with various embodiments.

Various embodiments may be implemented in any of a variety of wireless communication devices, an example 500 of which is illustrated in FIG. 5. With reference to FIGS. 1-5, the wireless communication device 500 (which may correspond, for example, the wireless communication devices 110, 120, 200) may include a processor 502 coupled to a touchscreen controller 504 and an internal memory 506. The processor 502 may be one or more multicore integrated circuits (ICs) designated for general or specific processing tasks. The internal memory 506 may be volatile or nonvolatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless communication device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The wireless communication device 500 may include a cellular network wireless modem chip 516 that enables communication via a cellular network and is coupled to the processor. The wireless communication device 500 may include a peripheral device connection interface 518 coupled to the processor 502. The peripheral device connection interface 518 may be singularly configured to accept one type of connection, or multiply configured to accept various types of physical and communication connections, common or proprietary, such as universal serial bus (USB), FireWire, Thunderbolt, or peripheral component interconnect express (PCIe). The peripheral device connection interface 518 may also be coupled to a similarly configured peripheral device connection port (not shown). The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500.

The processor 502 may be any programmable microprocessor, microcomputer or multiple processor chip or chips that can be configured by software instructions (applications) to perform a variety of functions, including the functions of various embodiments described herein. In some devices, multiple processors may be provided, such as one processor dedicated to wireless communication functions and one processor dedicated to running other applications. Typically, software applications may be stored in the internal memory 506 before they are accessed and loaded into the processor 502. The processor 502 may include internal memory sufficient to store the application software instructions. In many devices, the internal memory 506 may be a volatile or nonvolatile memory, such as flash memory, or a mixture of both. For the purposes of this description, a general reference to memory refers to memory accessible by the processor 502, including internal memory or removable memory plugged into the device and memory within the processor 502 itself.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit various embodiments to a particular order, sequence, type of network or carrier.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, Flash memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc in which disks usually reproduce data magnetically, while discs reproduce data optically with lasers. Combinations of the storage media are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of performing a tune-away from a first subscription to a second subscription on a wireless communication device, the wireless communication device having a transmitter, the method comprising:
   determining whether the first subscription will utilize the transmitter during the tune-away to the second subscription when the transmitter is operating in envelope tracking mode; and
   switching the transmitter from envelope tracking mode to average power tracking mode during the tune-away in response to determining that the first subscription will utilize the transmitter during the tune-away to the second subscription.

2. The method of claim 1, the method further comprising switching the transmitter back to envelope tracking mode after the tune-away is complete.

3. The method of claim 1, wherein the second subscription utilizes a receiver of the wireless communication device during the tune-away.

4. The method of claim 1, further comprising turning off the transmitter for a duration of the tune-away in response to determining that the first subscription will not utilize the transmitter during the tune-away to the second subscription.

5. The method of claim 1, wherein switching the transmitter from envelope tracking mode to average power tracking mode during the tune-away reduces interference of the first subscription on the second subscription during the tune-away.

6. The method of claim 1, wherein the transmitter operates at a higher average power in average power tracking mode than in envelope tracking mode during the tune-away.

7. The method of claim 1, wherein:
   the transmitter comprises a mode switch, an envelope tracking power supply, and an average power tracking power supply; and
   switching the transmitter from envelope tracking mode to average power tracking mode during the tune-away comprises causing the mode switch to switch from the envelope tracking power supply to the average power tracking power supply.

8. The method of claim 1, further comprising:
   determining whether interference of the first subscription on the second subscription during the tune-away exceeds a threshold;
   switching the transmitter from envelope tracking mode to average power tracking mode during the tune-away in response to determining that the interference caused by the first subscription on the second subscription during the tune-away exceeds the threshold; and
   leaving the transmitter in envelope tracking mode during the tune-away in response to determining that the interference caused by the first subscription on the second subscription during the tune-away does not exceed the threshold.

9. A wireless communication device, comprising:
   a radio frequency (RF) resource comprising a transmitter and a receiver;
   a processor coupled to the RF resource, configured to connect to a first subscriber identity module (SIM) associated with a first subscription and to a second SIM associated with a second subscription, and configured with processor-executable instructions to:
      determine whether the first subscription will utilize the transmitter during a tune-away of the receiver to the second subscription when the transmitter is operating in envelope tracking mode; and
      switch the transmitter from envelope tracking mode to average power tracking mode during the tune-away in response to determining that the first subscription will utilize the transmitter during the tune-away to the second subscription.

10. The wireless communication device of claim 9, wherein the processor is further configured with processor-executable instructions to switch the transmitter back to envelope tracking mode after the tune-away is complete.

11. The wireless communication device of claim 9, wherein the second subscription utilizes the receiver of the RF resource during the tune-away while the first subscription continues to utilize the transmitter.

12. The wireless communication device of claim 9, wherein the processor is further configured with processor-executable instructions to turn off the transmitter for a duration of the tune-away in response to determining that the first subscription will not utilize the transmitter during the tune-away to the second subscription.

13. The wireless communication device of claim 9, wherein switching the transmitter from envelope tracking mode to average power tracking mode during the tune-away reduces interference of the first subscription on the second subscription during the tune-away.

14. The wireless communication device of claim 9, wherein the transmitter operates at a higher average power in average power tracking mode than in envelope tracking mode during the tune-away.

15. The wireless communication device of claim 9, wherein:
   the transmitter comprises a mode switch, an envelope tracking power supply, and an average power tracking power supply; and the processor is further configured with processor-executable instructions to switch the mode switch from the envelope tracking power supply to the average power tracking power supply in order to switch the transmitter from envelope tracking mode to average power tracking mode during the tune-away.

16. The wireless communication device of claim 9, wherein the processor is further configured with processor-executable instructions to:
determine whether interference of the first subscription on the second subscription during the tune-away exceeds a threshold;
switch the transmitter from envelope tracking mode to average power tracking mode during the tune-away in response to determining that the interference caused by the first subscription on the second subscription during the tune-away exceeds the threshold; and
leave the transmitter in envelope tracking mode during the tune-away in response to determining that the interference caused by the first subscription on the second subscription during the tune-away does not exceed the threshold.

17. A non-transitory computer readable storage medium having stored thereon processor-executable software instructions configured to cause a processor of a wireless communication device to perform operations comprising:
determining whether a first subscription on the wireless communication device will utilize a transmitter of the wireless communication device during a tune-away to a second subscription on the wireless communication device when the transmitter is operating in envelope tracking mode; and
switching the transmitter from envelope tracking mode to average power tracking mode during the tune-away in response to determining that the first subscription will utilize the transmitter during the tune-away to the second subscription.

18. The non-transitory computer readable storage medium of claim 17, wherein the stored processor-executable software instructions are configured to cause the processor to perform operations further comprising switching the transmitter back to envelope tracking mode after the tune-away is complete.

19. The non-transitory computer readable storage medium of claim 17, wherein the second subscription utilizes a receiver of the wireless communication device during the tune-away.

20. The non-transitory computer readable storage medium of claim 17, wherein the stored processor-executable software instructions are configured to cause the processor to perform operations further comprising turning off the transmitter for a duration of the tune-away in response to determining that the first subscription will not utilize the transmitter during the tune-away to the second subscription.

21. The non-transitory computer readable storage medium of claim 17, wherein switching the transmitter from envelope tracking mode to average power tracking mode during the tune-away reduces interference of the first subscription on the second subscription during the tune-away.

22. The non-transitory computer readable storage medium of claim 17, wherein the transmitter operates at a higher average power in average power tracking mode than in envelope tracking mode during the tune-away.

23. The non-transitory computer readable storage medium of claim 17, wherein:
the transmitter comprises a mode switch, an envelope tracking power supply, and an average power tracking power supply; and
the stored processor-executable software instructions are further configured to cause the processor to perform operations such that switching the transmitter from envelope tracking mode to average power tracking mode during the tune-away comprises causing the mode switch to switch from the envelope tracking power supply to the average power tracking power supply.

24. The non-transitory computer readable storage medium of claim 17, wherein the stored processor-executable software instructions are configured to cause the processor to perform operations further comprising:
determining whether interference of the first subscription on the second subscription during the tune-away exceeds a threshold;
switching the transmitter from envelope tracking mode to average power tracking mode during the tune-away in response to determining that the interference caused by the first subscription on the second subscription during the tune-away exceeds the threshold; and
leaving the transmitter in envelope tracking mode during the tune-away in response to determining that the interference caused by the first subscription on the second subscription during the tune-away does not exceed the threshold.

25. A wireless communication device, comprising:
a radio frequency (RF) resource comprising a transmitter and a receiver;
means for determining whether a first subscription on the wireless communication device will utilize the transmitter during a tune-away of the receiver to a second subscription on the wireless communication device, wherein the transmitter is operating in envelope tracking mode; and
means for switching the transmitter from envelope tracking mode to average power tracking mode during the tune-away in response to determining that the first subscription will utilize the transmitter during the tune-away to the second subscription.

* * * * *